United States Patent [19]
Leksell et al.

[11] Patent Number: 5,025,321
[45] Date of Patent: Jun. 18, 1991

[54] FACSIMILE MACHINE USING THIN FILM ELECTROLUMINESCENT DEVICE

[75] Inventors: David Leksell, Oakmont; Zoltan K. Kun, Churchill Boro, all of; Juris A. Asars, Murrysville Borough, all of Pa.

[73] Assignee: Westinghouse Electric Corp., Pittsburgh, Pa.

[21] Appl. No.: 527,213

[22] Filed: May 22, 1990

[51] Int. Cl.$^5$ .................... H04N 1/028; H04N 1/036; H04N 1/29; G01D 15/14
[52] U.S. Cl. .................................. 358/296; 358/300; 346/107 R; 346/160
[58] Field of Search ...................... 358/296, 300, 302; 346/160, 107 R, 108

[56] References Cited
U.S. PATENT DOCUMENTS

| | | | |
|---|---|---|---|
| 4,424,523 | 1/1984 | Snelling | 346/160 |
| 4,535,341 | 8/1985 | Kun | 346/107 R |
| 4,734,723 | 3/1988 | Ishitobi | 346/160 |
| 4,807,047 | 2/1989 | Sato | 358/300 |
| 4,899,184 | 2/1990 | Leksell | 346/160 |

Primary Examiner—Benjamin R. Fuller
Assistant Examiner—Scott A. Rogers
Attorney, Agent, or Firm—John K. Williamson

[57] ABSTRACT

A facsimile machine having a thin film electroluminescent pixel array which is used as the controlled light beam source for creating an image on a photoreceptive copying apparatus when the machine is in a write mode and using the same TFEL pixel array as a source of illuminating light to the scanning sensor when the machine is in the read mode. In other embodiments the primary light emission from the pixel array is used in the write mode and secondary emission from the pixels is used for the illuminating source in the read mode. Embodiments of the TFEL array structure include combination with scanning sensors on the same substrate. Other embodiments include the scanning sensor and the pixel array on separate substrates positioned in generally parallel planes.

24 Claims, 4 Drawing Sheets

FACSIMILE MACHINE USING THIN FILM ELECTROLUMINESCENT DEVICE

BACKGROUND OF THE INVENTION

The invention relates to a facsimile machine of the type having two modes of operation. In the read mode a document is scanned and the image of the document is converted into an electrical signal which is representative of the image. This electrical signal can then be stored, transmitted via telephone or radio wave, or processed in another manner. In the second or write mode the facsimile machine receives an electrical signal, such as for instance from a telephone line, and converts the electrical signal into a fixed copy of the image represented by such electrical signal. Such facsimile, or fax, machines typically output the copy on a medium such as paper. It is highly desirable that one machine perform both functions by operating in both read and write modes. Typically prior art designs used separate mechanisms for the read mode in which a light source is directed upon the document and a signal is produced by the reflected light from the document as it is detected by a photoelectric detector which typically would be a photoelectric cell or similar sensor. Separate apparatus within the machine is used when an image signal is received by the fax machine to convert that image signal into an actual fixed copy. Prior art devices have included thermal paper, and photographic means. More recently fax machines have used a scanning laser head to place a photo image on a photo receptor device such as an electro-static drum copier. Such laser heads are relatively large and expensive, and in many instances require complicated scanning mirrors Both thermal printing heads and scanned laser printing heads are relatively slow and often require that the signal to be processed must be stored as it is received from a transmission line. Prior art fax machines have basically housed two separate systems, one being a copier, and one being a reading scanner device with little integration of the two separate functions.

Thin film electroluminescent line array emitters and printers using such are known. An example of this type of application is disclosed in U.S. Pat. No. 4,535,341 to Kun et al., one of the inventors of the present invention, and this patent being assigned to the assignee of the present invention. U.S. Pat. No. 4,535,341 is incorporated herein by reference. Other examples of thin film electroluminescent devices being used in printers are shown in U.S. Pat. Nos. 4,734,723 and 4,807,047.

It is an object of this invention to provide a facsimile machine which uses a thin film electroluminescent device to provide the photo-imaging source to a photoreceptor in the write mode, and also to provide the source for illuminating the paper when a scanning sensor is used in the reading mode.

It is also an object of this invention to provide a second source of light from a thin film electroluminescent device to be used during the read mode of a facsimile machine.

SUMMARY OF THE INVENTION

A thin film electroluminescent line array structure having edge emitting pixels is positioned in a facsimile machine so as to selectively direct at least a portion of the light emitted from said pixels to a photoreceptor copying means when the facsimile machine is in the write mode. Light from the same pixels is also used to illuminate the document providing an image to a scanning sensor element when the facsimile machine is in the read mode. The single light source provides the lighting function for both read and write modes. The photosensor element for the read mode can be attached to the substrate of the pixel array or can be part of the same substrate as the pixel array. While the primary light out of the edge of the pixels is directed to produce a high resolution image on the photoreceptor copying equipment in the read mode; secondary light emissions from the edges intermediate adjacent pixels can be used as a source of illumination for the read mode. The electroluminescent thin film array can be positioned in a manner so as to be adjacent the scanner sensor and the document in a read mode and moved to a position adjacent the photoreceptor copier in the write mode. Alternative document and paper paths may be used for the read and write mode, respectively, permitting the pixel array to remain fixed.

BRIEF DESCRIPTION OF THE DRAWINGS

The features and advantages of the invention will become apparent from consideration of the description in connection with the accompanying figures in which.

DESCRIPTION OF FIGURES AND EMBODIMENTS

The invention is directed to the use of a thin film electroluminescent device which acts as a high resolution electronic controlled light source for photo-imaging and as a light source for a scanning sensor in a facsimile machine.

Figure 1:
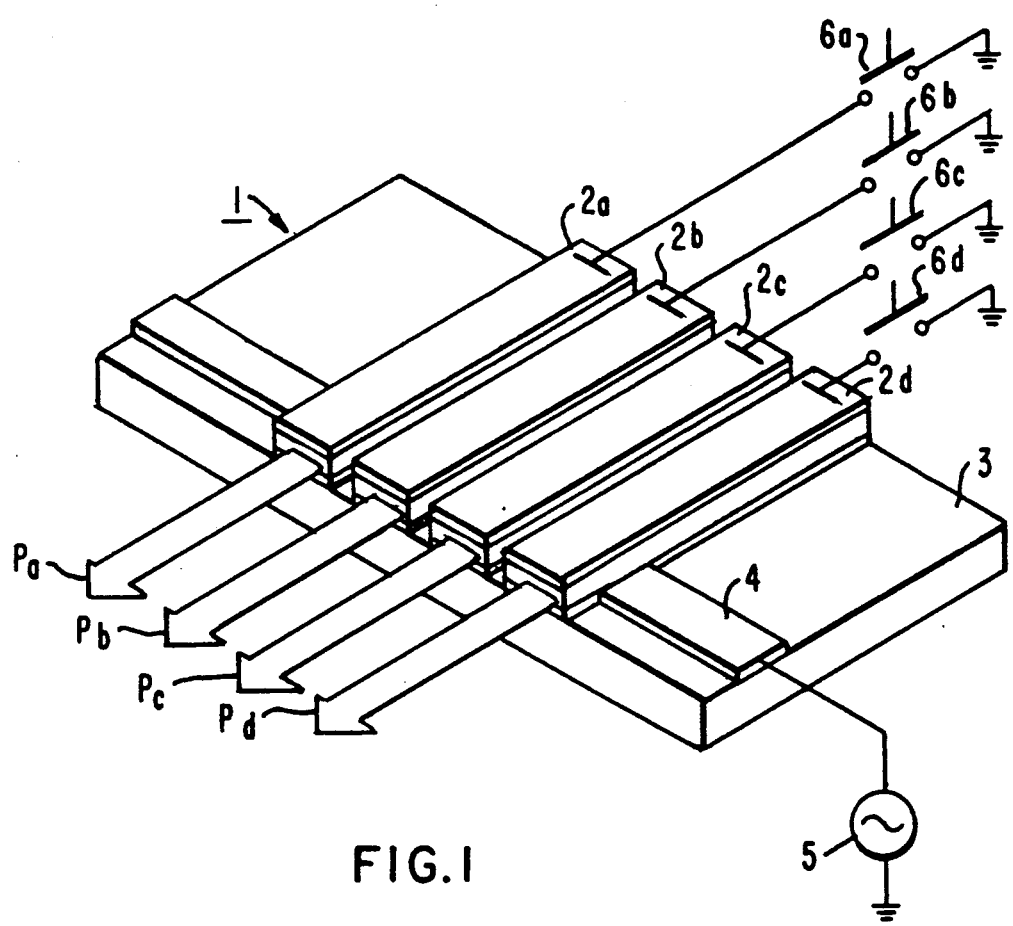
FIG. 1 is a diagrammatic illustration shown in partial cross section of a thin film electroluminescent line array showing four adjacent pixels.

Thin film electroluminescent devices are well suited to use in forming a line array of pixels, each emitting a controlled beam of light at the edge of the device. The edge emitted light is of high intensity and provides very good resolution in imaging systems. A typical array for use in a facsimile machine is shown in FIG. 1. The array 1 shown has four pixels, 2a, b, c, d. It is to be understood that in an actual facsimile machine using the invention the pixel array device would be composed of hundreds or thousands of similarly arranged pixels. The pixels are formed on a substrate material 3 having a common electrode 4 which is electrically connected to an excitation source 5. The upper surface of each respective pixel contains a pixel electrode which is connected to a controlling electrical signal through a signal switching device such as represented at 6a, b, c, d. When a signal is provided to the pixel electrode by means of switch device 6a through d, a respective primary light beam $P_a$, $P_b$, $P_c$, $P_d$ is caused to emit from the edge of the respective pixel. Switches 6a through d are diagrammatic in nature and in the actual facsimile machine electronic switching circuitry would be used to generate respective pixel signals.

Figure 2:
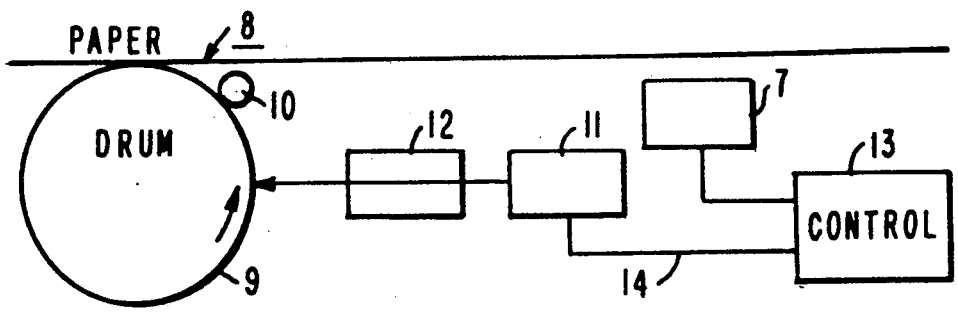
FIG. 2 is a diagrammatic illustration of a presently preferred embodiment using a pixel array which is shown in a write mode position.

FIG. 2 shows a diagrammatic representation of a facsimile machine embodying the invention. As shown the machine would be in a write mode. A paper path 8 exists which would deliver plain paper to the electrostatic copy portion of the machine and remove the fixed paper copy from the machine. A scanning sensor 7 is shown, but would not be in operation in the write mode. Control 13 provides signals representative of an image via cable 14 to a pixel head 11. The pixel head 11 is similar to that shown in FIG. 1 and comprises a line array of edge emitting light devices or pixels. The light beams from the pixel head 11 are focused through a lens 12 to a photoreceptive device, such as drum 9. The drum 9 is an electrostatic charge type device, the operation of which is well-known. A toner developer 10 is used in conjunction with the drum 9 to provide a transfer of the image from the drum to the paper on paper path 8. Other well-known elements in the photostatic copying process between the drum 9 and the paper on paper path 8 have been omitted for simplicity.

Figure 3:
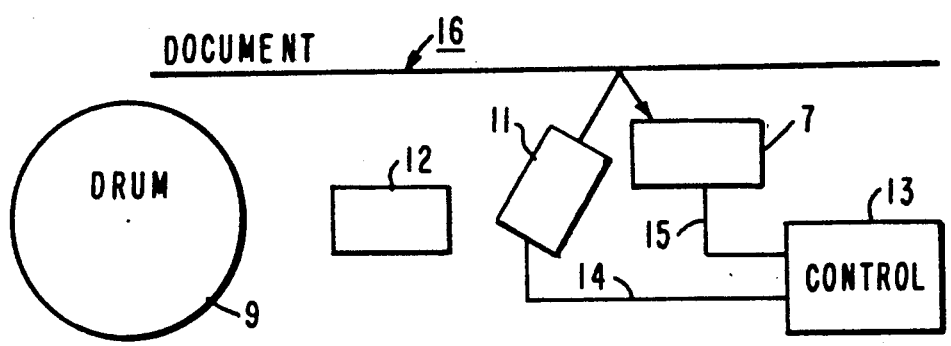
FIG. 3 is a diagrammatic illustration of the embodiment shown in FIG. 2 with the pixel array moved to a read mode position.

FIG. 3 shows the apparatus of the facsimile machine as depicted in FIG. 2 in the read mode. In the read mode it is desired to convert the image on an original document into electrical signals representative of that image for transmission, storage, or for later generation into a copy. In FIG. 3 the drum 9 and write mode focusing lens 12 are shown but are not operating. The pixel head 11 has been directed toward a document path 16. Control 13 now supplies via cable 14 signals to provide a source of illuminating light from the pixel head 11 to reflect upon an original document moving on the document path 16 and thereby provide a signal to the scanning sensor 7. The scanning sensor 7 is a photosensitive device, such as a photocell, which generates a signal representative of the image contained on the document. Scanning sensor 7 could be either resistive or a semiconductor device which provides an output signal to cable 15 which is representative of the image contained on the document. Control 13 can process the signal from the scanning head 7 when the facsimile machine is in the read mode, and a typical control process would be to transmit the signal to a telephone or radio transmission output.

As can be seen from FIGS. 2 and 3, the same pixel head is used for the dual functions of illuminating the document in the read mode and forming the image in the write mode. In this particular embodiment the pixel array head 11 has been displaced to cause the emitted beam to illuminate either the photoreceptor or the original document. In other embodiments it will be understood that the array will be relatively fixed while lenses or other means can be used to direct the emitted beam to its two functions.

Figure 4:
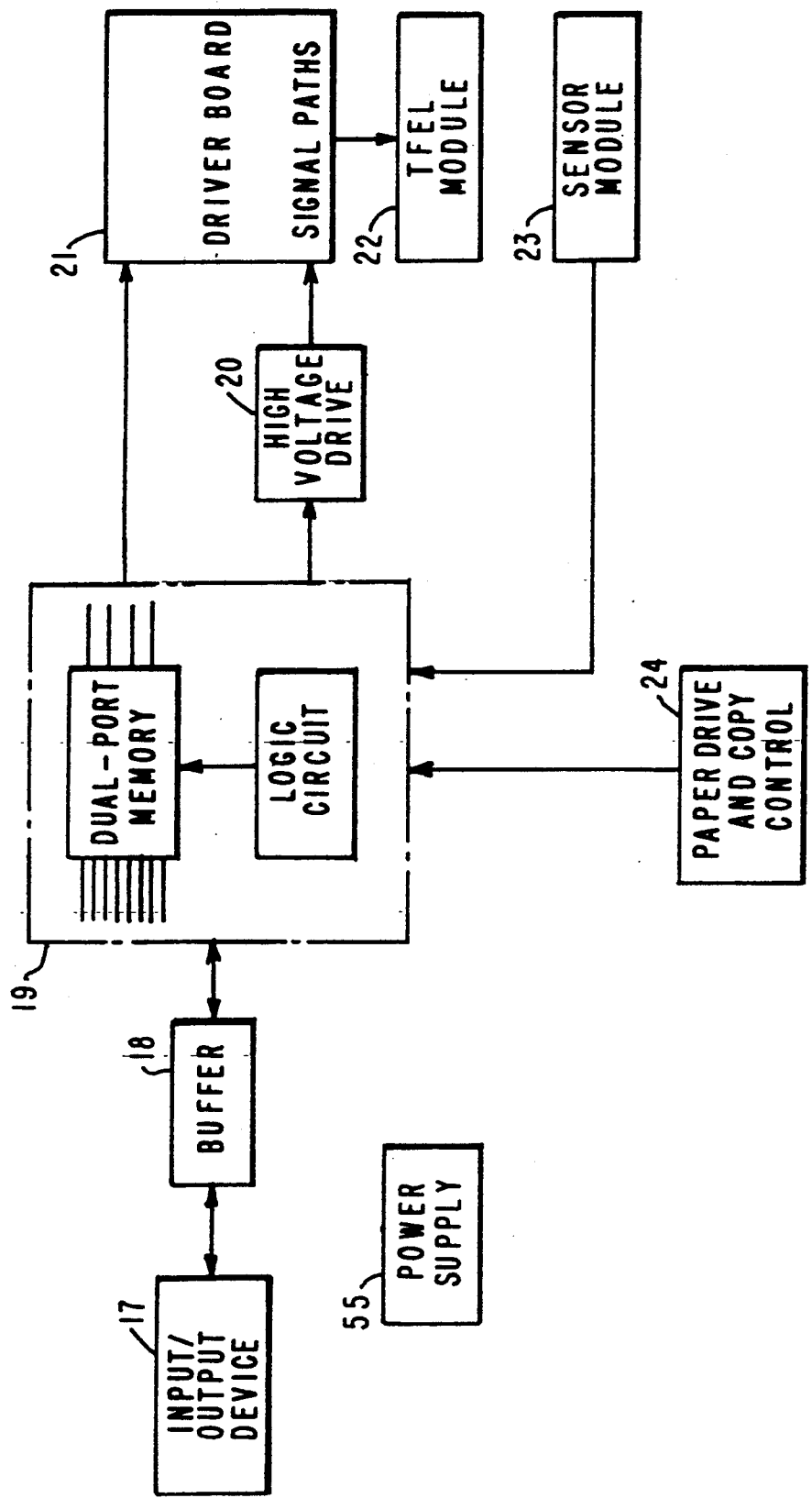
FIG. 4 is a block diagram showing a control scheme for operation of a thin film electroluminescent array light source in a dual mode facsimile machine.

FIG. 4 shows a portion of a control having an input/output device 17 which could include devices such as personal computer, telephone transmission interfaces, or other known devices. Signals from 17 can be stored in buffer 18 when the speed of reception or transmission exceeds that of the read or write modes of the fax machines. One of the advantages of the present preferred embodiment using the pixel array is that such fax machines can process or generate signals in the read and write modes at a rate equal to or greater than that of the telephone transmission line. Therefore, buffer storage, such as 18, can usually be omitted. Control circuit 19 controls both the sensor module 23 and the thin film electroluminescent (TFEL) module 22. High voltage drive 20 is used as an excitation source for the pixel array. Driver board 21 provides an interface for the signal path to the TFEL module 22. A general power supply source 55 is available for all control devices. In addition to the TFEL module 22 and the sensor module 23 other functions of the fax machine to control the copying and paper drive are provided for by the auxiliary control circuit 24.

The control scheme shown in FIG. 4 can be used to selectively activate pixels in the array 1, such that in the read mode some portions of the documents are illuminated and others are not illuminated. This can be used for many purposes, including security of transmission, and to shorten signals by deleting unwanted areas of-scan during the read mode.

One of the advantages of the TFEL pixel arrangement using edge emitting light beams is the small size of the head used in the control lighting during the write mode. Further optimization of the facsimile machine function can be obtained by integrating the pixel array with the scanning sensor.

Figure 5:
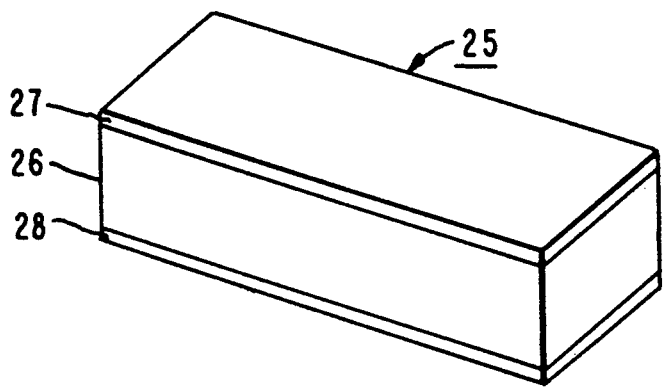
FIG. 5 is a diagrammatic representation of a thin film device having electro-optical pixel array and photosensors on a common substrate.

FIG. 5 shows a diagrammatic representation of an integrated structure 25 having a substrate 26 which has an area 27 containing a TFEL pixel array. On the opposite side of the substrate from the pixel array 27 is arranged a scanning sensor array 28. As diagrammatically shown in FIG. 5, it is to be understood that areas 27 and 28 contain many discrete light emitting pixels in 27 and many discrete photosensitive areas in the scanning sensor area 28. One of the advantages of the structure shown at 25 is that the distance between respective pixels and sensor elements 27, 28 can be on the order of a few millimeters or less. Such narrow distance between the light source and its respective scanning sensor in the read mode can provide high resolution signals.

Figure 6:
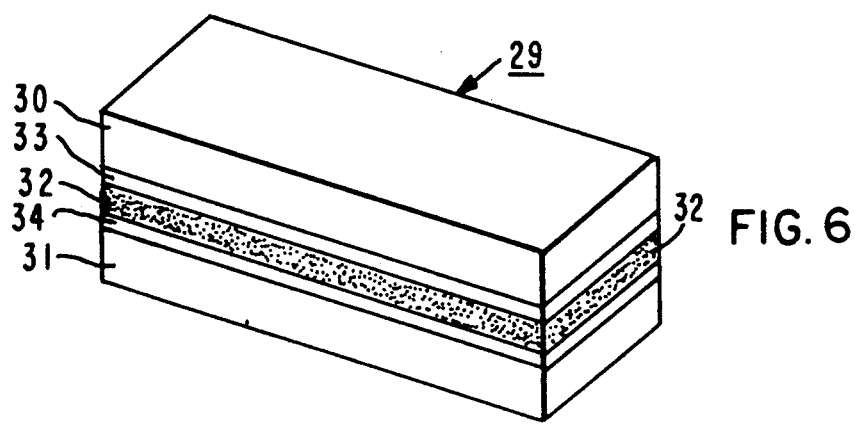
FIG. 6 is a diagrammatic illustration showing a pair of substrates, one containing an electroluminescent pixel array, and the other having respective photosensors.

FIG. 6 shows a composite TFEL head 29 having a substrate 30 bonded to a second substrate 31. The bonded area at 32 can be controlled in its dimension between respective substrates. A pixel array area 33 is formed on substrate 30 along the lower edge portion adjacent substrate 31. Formed on the upper surface of substrate 31 is a scanning sensor area 34 which is adjacent the pixel array 33. In this embodiment by controlling the distance between the substrates 30, 31 in the area of bonding 32 an optimum distance and angle between the light source and scanning sensor can be maintained in the read mode of the fax machine.

Figure 7:
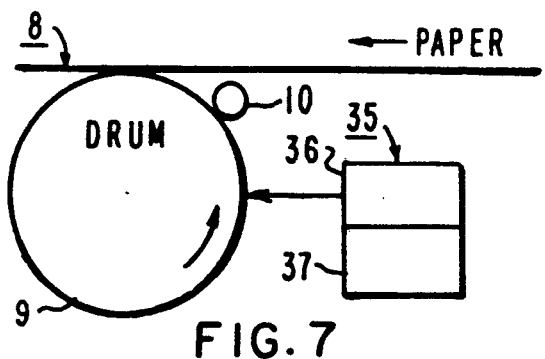
FIG. 7 is a diagrammatic illustration of a presently preferred embodiment showing a single head having both a light emitting pixel array and photosensitive sensor arrangements, shown in the write mode.
Figure 8:
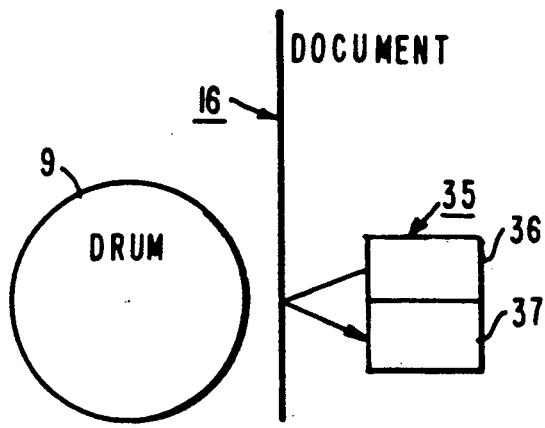
FIG. 8 is a diagrammatic representation of an embodiment similar to that shown in FIG. 7 in a read mode.

Operation of a head having a TFEL pixel array and scanning sensors is shown in FIGS. 7 and 8. FIG. 7 shows a write mode of a facsimile machine having a photoreceptor such as drum 9 with associated toner roller 10 and other known electrostatic copying equipment not being shown. Paper path 8 removes the image from the photoreceptor drum 9. The head 35 has a pixel array portion 36 attached thereto a scanning sensor arrangement 37. Head 35 could be composed of either separate pixel array and scanning sensors or could use the structures shown in FIGS. 5 and 6. In the write mode controlled light emissions from the pixel array of TFEL devices 36 provide an image to the drum. In the write mode the sensor arrangement 37 is not utilized. In FIG. 8 a fax machine similar to that shown in FIG. 7 is seen where a document path 16 is established intermediate the head 35 and the photoreceptor drum 9. Establishing the document path this way permits the head to remain relatively fixed in the same position. Head 35 having pixel array portion 36 and scanning sensor portion 37 is shown in the read mode of the fax machine. Illuminating light from the TFEL portion 36 are directed to the original document and reflected to the scanning sensor portion 37, thereby providing an output signal from the scanning sensor 37 representative of the image contained on the document. While the combined pixel and scanning sensor head 35 shown in FIGS. 7 and 8 have been shown as a generally fixed head device such head can also be utilized in a movable position as shown in FIGS. 2 and 3. In addition while the FIGS. 7 and 8 do not show optic or lens systems on either the pixel array 36 or the sensory head 37, optical systems such as lenses can be used to further enhance the performance of the device or to direct the output beam.

Figure 9:
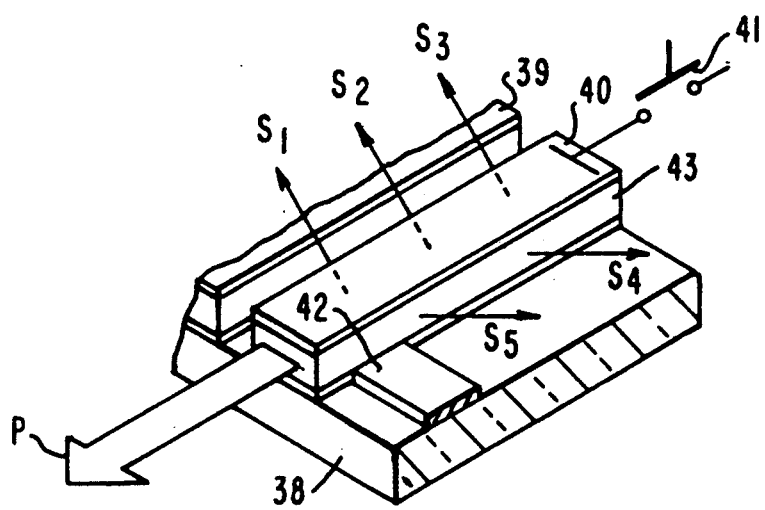
FIG. 9 is fragmented view in partial section of a diagrammatic representation of a pixel array similar to that shown in FIG. 1, having primary and secondary light emissions.

The pixel arrangement as shown in FIG. 1 shows primary light emissions generating a generally rectangular cross-sectional area beam of light being emitted from the face edge of the pixels 2a through 2d. In addition to this face edge emission of primary light, stray or secondary light is also emitted from the pixels. FIG. 9 is a fragmented diagrammatic illustration of a pixel array as used in a facsimile machine having pixels 39 and 40 formed on substrate 38. It is to be understood that actual arrays would contain many more pixels. The pixel 40 is excited via common electrode 42. When the signal switch 41 is operated a primary controlled light beam P is emitted from the face edge of the pixel 40. Also emitted during excitation of the pixel is a secondary or stray light emission represented by S1 through S5. While the secondary emission has been shown as series of discrete beams it is to be understood that a generally continuous beam of emission of light occurs all along the side edges of each pixel. $S_1$, $S_2$ and $S_3$ show emission from the inner side edge of the pixel while $S_4$ and $S_5$ are representative of emissions out of the closer side edge 43 of the pixel. While in some applications of the device this secondary emission will not be utilized in the operation of the pixel array, one presently preferred embodiment does utilize the secondary emission from the pixel. Because the pixel by its structure tends to be longer on its side, approximately 40 millimeters, than on its face edge, approximately 1 millimeter, the area for light emission is greater on the side edges of the pixel 40 in the area of the secondary emissions $S_1$ through $S_5$ than in the primary emission P. In prior discussed embodiments it was shown how a TFEL pixel array can be used in both the write and read mode. The principal, P, beam is used from the pixel to accomplish both of these operations.

Another preferred embodiment is to use the secondary emission S from the pixels as the illuminating source during the read mode. The secondary emission can be used separately as a light source in the read mode or combined with the primary beam emitted from the pixel to be used as the illuminating light source in the read mode. It may be desirable to use an optical system in connection with the secondary emission to focus or collect the secondary emission to better direct it to the original document. Lens systems may be attached to the head or the substrate in the area of the secondary emission to direct the secondary emission in the read mode.

Figure 10:
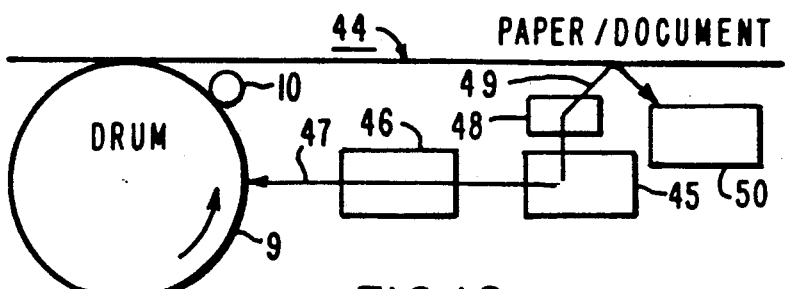
FIG. 10 is a diagrammatic illustration of a presently preferred embodiment having a fixed thin film electroluminescent pixel array.

FIG. 10 shows a diagrammatic representation of a fax machine using both the primary and secondary emissions from a pixel array. Photoreceptor drum 9 and toner 10 are as previously described. A document/paper path 45 delivers both paper to the photoelectrostatic copying portion of the facsimile machine and documents to the scanner in the read mode. As can be understood, separate document and paper paths may be used in this embodiment. A TFEL pixel array head 45 uses both primary and secondary light emissions as shown in FIG. 9. Primary emissions 47 from the head 45 are directed through a lens 46 and onto a photoreceptive drum 9 during the write mode. During the read mode the secondary emission from the pixel array head 45 are directed through lens 48 to create an illumination beam from secondary emission 49 which is directed to a document on the document path 44, and then to reflect to the scanning sensor 50. By using controls as previously described the single TFEL pixel array head 45 can be controlled to provide a primary emission beam 47 to image on photoreceptor drum 9 during the write mode and a secondary emission beam 49 to provide illuminating light during the read mode to the scanning sensor 50.

Based on the foregoing description of the invention other different embodiments of the present invention may be constructed without departing from the spirit and scope of the present invention.

We claim:

1. A facsimile machine having a read mode for producing electrical signals representative of a document and having a write mode for producing a fixed copy of a document from a representative electrical signal comprising:

sensor means for scanning a document and converting light images received into an electrical signal representative of such document;
  photoreceptor means for forming a fixed copy from light images received; and
  an edge emitting thin film electroluminescent line array containing a plurality of pixels for selectively directing at least a portion of light emitted from said pixels to said photoreceptor means when such facsimile machine is in a write mode thereby transmitting light images to said photoreceptor means and for selectively directing at least a portion of light emitted from said pixels to illuminate a document thereby providing light images to said sensor means when said facsimile machine is in a read mode.

2. The facsimile machine of claim 1 wherein said pixels are formed on a substrate and said sensor means includes photosensors formed in a line array on said substrate and spaced from said edge emitting thin film electroluminescent line array.

3. A facsimile machine having a read mode for producing electrical signals representative of a document and having a write mode for producing a fixed copy of a document from a representative electrical signal comprising:

sensor means for scanning a document and converting light images received into an electrical signal representative of such document;

photoreceptor means for forming a fixed copy from light images received;

an edge emitting thin film electroluminescent line array containing a plurality of pixels for selectively directing at least a portion of light emitted from said pixels to said photoreceptor means when such facsimile machine is in a write mode thereby transmitting light images to said photoreceptor means and for selectively directing at least a portion of light emitted from said pixels to illuminate a document thereby providing light images to said sensor means when said facsimile machine is in a read mode;

wherein said pixels are formed on a substrate and said sensor means includes photosensors formed on said substrate; and wherein said pixels are formed along one side of said substrate and said photosensors are formed on the opposite side of said substrate.

4. A facsimile machine having a read mode for producing electrical signals representative of a document and having a write mode for producing a fixed copy of a document from a representative electric signal comprising:

sensor means for scanning a document and converting light images received into an electrical signal representative of such document;

photoreceptor means for forming a fixed copy from light images received;

an edge emitting thin film electroluminescent line array containing a plurality of pixels for selectively directing t least a portion of light emitted from said pixels to said photoreceptor means when such facsimile machine is in a write mode thereby transmitting light images to said photoreceptor means and for selectively directing at least a portion of light emitted from said pixels to illuminate a document thereby providing light images to said sensor means when said facsimile machine is in a read mode; and wherein said pixels are formed on a first substrate and said sensor means includes photosensors formed on a second substrate.

5. The facsimile machine of claim 4 wherein said first substrate and said second substrate are attached to a common head in said facsimile machine.

6. The facsimile machine of claim 5 wherein said first substrate and said second substrate are positioned adjacent and in generally parallel planes.

7. The facsimile machine of claim 4 wherein said substrates are joined together adjacent and in generally parallel planes.

8. The facsimile machine of claim 4 wherein said pixels are formed along a first edge of said first substrate and said sensors are formed along a second edge of said second substrate, and said joined substrates form a common head in such facsimile machine.

9. The facsimile machine of claim 8 wherein said first substrate and said second substrate are positioned adjacent and in generally parallel planes and with said first edge and said second edge positioned along adjacent surfaces of said substrate, thereby providing light emitted from said pixels and light received by said sensors along the same side of said head.

10. The facsimile machine of claim 8 wherein said first substrate and said second substrate are positioned adjacent and in generally parallel planes and with said first edge and said second edge positioned along opposite surfaces of said substrates thereby providing light emitted from said pixels and light received by said sensors along the same side of said head.

11. The facsimile machine of claim 1 wherein said pixels emit a primary beam directed to said photoreceptor means in the write mode, and a secondary emission which is directed toward a document in the read mode.

12. The facsimile machine of claim 11 further including optical lens means for collecting the secondary emission and directing said secondary emission toward such document.

13. The facsimile machine of claim 11 wherein said secondary emission is directed away from said pixel array in a generally perpendicular direction to the primary beam of said pixels.

14. The facsimile machine of claim 13 further including optical lens means for collecting the secondary emission and directing said secondary emission toward such document.

15. The facsimile machine of claim 1 wherein said pixels emit a primary beam and a secondary emission; and wherein said primary beam is directed toward said photoreceptor means in said write mode; and at least a portion of said primary beam and at least a portion of said secondary emission are directed toward a document in the read mode.

16. The facsimile machine of claim 1 wherein said line array is affixed to a head; and said head being movable from a first position in the write mode and a second position in the read mode.

17. The facsimile machine of claim 16 wherein said sensor means includes photosensors affixed to and movable with said head.

18. The facsimile machine of claim 17 wherein said pixels are formed on a substrate and said sensor means includes photosensors formed on said substrate.

19. A facsimile machine having a read mode for producing electrical signals representative of a document and having a write mode for producing a fixed copy of a document from a representative electrical signal comprising:

sensor means for scanning a document and converting light images received into an electrical signal representative of such document;

photoreceptor means for forming a fixed copy from light images received;

an edge emitting thin film electroluminescent line array containing a plurality of pixels for selectively directing at least a portion of light emitted from said pixels to said photoreceptor means when such facsimile machine is in a write mode thereby transmitting light images to said photoreceptor means and for selectively directing at least a portion of light emitted from said pixels to illuminate a document thereby providing light images to said sensor means when said facsimile machine is in a read mode;

wherein said line array is affixed to a head, and said head being movable from a first position in the write mode and a second position in the read mode;

wherein said sensor means includes photosensors affixed to and movable with said head;

wherein said pixels are formed on a substrate and said sensor means includes photosensors formed on said substrate; and wherein said pixels are formed along one side of said substrate and said photosensors are formed on the opposite side of said substrate.

20. A facsimile machine having a read mode for producing electrical signals representative of a document and having a write mode for producing a fixed copy of a document from a representative electrical signal comprising:

sensor means for scanning a document and converting light images received into an electrical signal representative of such document;

photoreceptor means for forming a fixed copy from light images received;

an edge emitting thin film electroluminescent line array containing a plurality of pixels for selectively directing at least a portion of light emitted from said pixels to said photoreceptor means when such facsimile machine is in a write mode thereby transmitting light images to said photoreceptor means and for selectively directing at least a portion of light emitted from said pixels to illuminate a document thereby providing light images to said sensor means when said facsimile machine is in a read mode;

wherein said line array is affxied to a head, and said head being movable from a first position in the write mode and a second position in the read mode; and wherein said pixels are formed on a first substrate and said sensor means includes photosensors formed on a second substrate.

21. The facsimile machine of claim 20 wherein said substrates are joined together adjacent and in generally parallel planes.

22. The facsimile machine of claim 20 wherein said photosensors and said pixels are along edges of adjacent sides of said substrate.

23. The facsimile machine of claim 1 further comprising a fixed head having affixed thereto said array and at least a portion of said scanning sensor means; a document path means for positioning a document adjacent said head in the read mode; and means for positioning said head and said photoreceptor means adjacent each other in the write mode.

24. The facsimile machine of claim 1 wherein the emissions from said pixels is selectively controlled during the read mode to produce light images to said sensor means only from selected areas of said document.

* * * * *